US011790053B2

(12) United States Patent
Uchibori et al.

(10) Patent No.: US 11,790,053 B2
(45) Date of Patent: Oct. 17, 2023

(54) INFORMATION PROCESSING SYSTEM, SERVER, NON-TRANSITORY COMPUTER-READABLE MEDIUM, AND METHOD FOR CONTROLLING ASSIGNMENT OF LICENSE

(71) Applicants: Hiroki Uchibori, Tokyo (JP); Hideki Ohhashi, Kanagawa (JP)

(72) Inventors: Hiroki Uchibori, Tokyo (JP); Hideki Ohhashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 332 days.

(21) Appl. No.: 16/811,319

(22) Filed: Mar. 6, 2020

(65) Prior Publication Data
US 2020/0293632 A1 Sep. 17, 2020

(30) Foreign Application Priority Data

Mar. 13, 2019 (JP) .................................. 2019-046557
Feb. 28, 2020 (JP) .................................. 2020-034344

(51) Int. Cl.
*G06F 21/10* (2013.01)
*G06F 21/12* (2013.01)

(52) U.S. Cl.
CPC .......... *G06F 21/105* (2013.01); *G06F 21/126* (2013.01)

(58) Field of Classification Search
CPC ...................... G06F 21/105; G06F 21/12–128
USPC ......................................................... 705/59
See application file for complete search history.

(56) References Cited

U.S. PATENT DOCUMENTS

| 5,671,412 | A | * | 9/1997 | Christiano ............. G06Q 30/04 |
| 9,065,863 | B1 | | 6/2015 | Tharakan et al. |
| 2007/0011748 | A1 | * | 1/2007 | Tiwari ................... G06F 21/105 |
| | | | | 726/26 |
| 2007/0198999 | A1 | | 8/2007 | Ohhashi |
| 2008/0027742 | A1 | | 1/2008 | Maeda |

(Continued)

FOREIGN PATENT DOCUMENTS

JP 2008-242660 A 10/2008
JP 2012-123653 6/2012

(Continued)

OTHER PUBLICATIONS

Software license, Wikipedia, 2017, 7 pages, [retrieved on Jun. 7, 2023], Retrieved from the Internet: <URL:https://web.archive.org/web/20171223134236/https://en.wikipedia.org/wiki/Software_license>.*

(Continued)

*Primary Examiner* — Geoffrey R St Leger
(74) *Attorney, Agent, or Firm* — Harness, Dickey & Pierce, P.L.C.

(57) ABSTRACT

An information processing system includes at least one server and one or more devices communicable with the server through a network. The information processing system includes circuitry configured to: manage a service in association with a device type that can use the service; manage the devices in association with the device type, the devices each being a target device to which a license is to be allocated; and compare a device type associated with the target device to which the license is to be allocated with the device type associated with the service, to determine whether an allocation of the license of the service to the target device is permitted.

20 Claims, 18 Drawing Sheets

(56) References Cited

U.S. PATENT DOCUMENTS

| | | | |
|---|---|---|---|
| 2009/0063350 A1* | 3/2009 | Briggs | H04L 63/10 705/59 |
| 2009/0119779 A1 | 5/2009 | Dean et al. | |
| 2009/0228984 A1 | 9/2009 | Sterin | |
| 2010/0318967 A1* | 12/2010 | Bhatia | G06F 9/44536 717/122 |
| 2010/0319072 A1* | 12/2010 | Abzarian | G06F 21/10 726/31 |
| 2011/0061102 A1 | 3/2011 | Aono et al. | |
| 2011/0145843 A1 | 6/2011 | Ohhashi et al. | |
| 2012/0127525 A1 | 5/2012 | Uchibori et al. | |
| 2012/0127527 A1 | 5/2012 | Nakabayashi et al. | |
| 2013/0063761 A1 | 3/2013 | Uchibori et al. | |
| 2013/0305394 A1 | 11/2013 | Nozue et al. | |
| 2013/0314732 A1 | 11/2013 | Nakabayashi et al. | |
| 2014/0082581 A1 | 3/2014 | Ohhashi | |
| 2014/0359631 A1 | 12/2014 | Ohhashi et al. | |
| 2015/0007270 A1 | 1/2015 | Walker et al. | |
| 2015/0081268 A1 | 3/2015 | Ohhashi et al. | |
| 2015/0169849 A1* | 6/2015 | Takemoto | G06F 21/105 726/27 |
| 2015/0332025 A1 | 11/2015 | Nakamura et al. | |
| 2015/0355918 A1 | 12/2015 | Ohhashi | |
| 2016/0012210 A1 | 1/2016 | Takemoto et al. | |
| 2016/0125175 A1 | 5/2016 | Ohhashi et al. | |
| 2017/0251122 A1 | 8/2017 | Matsushima et al. | |
| 2018/0109688 A1 | 4/2018 | Uchibori et al. | |
| 2018/0278715 A1 | 9/2018 | Uchibori et al. | |
| 2019/0073205 A1* | 3/2019 | Matsui | G06F 21/12 |
| 2019/0095594 A1 | 3/2019 | Uchibori | |
| 2019/0188362 A1 | 6/2019 | Uchibori | |
| 2019/0273829 A1 | 9/2019 | Ohhashi | |
| 2019/0303124 A1 | 10/2019 | Ohhashi | |

FOREIGN PATENT DOCUMENTS

| | | | | |
|---|---|---|---|---|
| JP | 2013-030082 A | 2/2013 | | |
| JP | 2013-235352 A | 11/2013 | | |
| JP | 2014-127020 A | 7/2014 | | |
| JP | 2015-049714 A | 3/2015 | | |
| JP | 2015-095051 A | 5/2015 | | |
| JP | 2015-219584 A | 12/2015 | | |
| JP | 2017-157200 | 9/2017 | | |
| KR | 10-2008-0011110 A | 1/2008 | | |
| WO | WO-2006028279 A1 * | 3/2006 | | G06F 21/10 |
| WO | WO-2019159690 A1 * | 8/2019 | | G06F 21/10 |

OTHER PUBLICATIONS

Managed services, Wikipedia, 2017, 6 pages, [retrieved on Jun. 7, 2023], Retrieved from the Internet: <URL:https://web.archive.org/web/20170325021401/https://en.wikipedia.org/wiki/Managed_services>.*
Extended European Search Report dated Jun. 19, 2020, issued in corresponding European Patent Application No. 20161544.0.
Office Action for European Application No. 20161544.0 dated Apr. 13, 2022.
Office Action dated Mar. 25, 2023 in Chinese Application No. 202010169680.5.
Office Action dated Aug. 15, 2023 issued in corresponding Japanese Patent Application No. 2020-034344.

* cited by examiner

FIG. 5

| ITEM | SETTING VALUE EXAMPLE |
|---|---|
| PACKAGE ID | 123 |
| PACKAGE NAME | SAMPLE PACKAGE |
| PACKAGE DESCRIPTION | THIS IS SAMPLE PACKAGE |
| SERVICE CLASS | SI_00012345_11111 |
| APPLICATION LIST | APPLICATION LIST |
| ... | ... |

FIG. 6

| ITEM | SETTING VALUE EXAMPLE |
|---|---|
| SERVICE CLASS | SI_00012345_11111 |
| SERVICE NAME | SAMPLE PACKAGE |
| SERVICE DESCRIPTION | THIS IS SAMPLE PACKAGE |
| SERVICE TYPE | CLOUD APPLICATION |
| PRESENCE OF LICENSE CONTROL | YES |
| DEVICE TYPE | MFP, IWB |
| ... | ... |

FIG. 7

| ITEM | SETTING VALUE EXAMPLE |
|---|---|
| LICENSE CODE | 01234567890123 |
| LICENSE NAME | SAMPLE LICENSE |
| LICENSE TYPE | USER LICENSE |
| EXPIRATION DATE | 6 MONTHS |
| SERVICE CLASS | SI_00012345_11111 |
| DEVICE TYPE | MFP, IWB |
| ... | ... |

FIG. 8

| ITEM | SETTING VALUE EXAMPLE |
|---|---|
| SERIAL ID | A0123456789 |
| DEVICE TYPE | MFP |
| ... | ... |

FIG. 10

Package Creation Screen

| | |
|---|---|
| Service name | SI_6050021_20190625025239 |
| Service overview | Easy link with files on cloud |
| Package name | Cloud Sample |
| License control | ● Valid  ○ Invalid |
| Device type | ☑ MFP  ☑ IWB  ☐ Projector  ☑ Videoconferencing system  ☐ Camera  ☐ Tablet  ☐ All |

[Next] (B1)

Package Information

Package name: Cloud Sample

Please select an application to be included in the package.

Application name: [easy]  [Search] (B5)  [Clear search]

| Icon | Application name | Description | Creation date | |
|---|---|---|---|---|
| 🖨 | Easy Scan | Scan and upload to the cloud. | 2019/9/13 | Registered |
| 🖨 | Easy Print | Print a file on the cloud. | 2019/9/13 | [Register] (B2) |

Registered package
• Easy Scan

[Deregister] (B4)    [Next] (B3)

FIG. 12

License Definition Information

Package name: Cloud Sample

| | |
|---|---|
| License name | Cloud Sample License |
| Validity period | ● 12 months  ○ Indefinite period |
| License type | Device |
| Charge category | ● Sale (Charge occurs)  ○ Demonstration (No charge) |
| Unit price | MFP [ ]<br>IWB [ ] |

[Register] B6

FIG. 14

Purchase License

| | |
|---|---|
| Product name | Cloud Sample ▼ |
| License | Cloud Sample License ▼ |
| Unit price | 10.00/Device |
| Quantity | ● Specify for each device type  ○ Specify collectively |
| | MFP [10]  IWB [2]  Videoconferencing system [ ] |
| Start date | 2019/09/17 ▼ |

[Purchase] — B7

| Device ID | Package A [Settings] | Package B [Settings] | Package C [Settings] |
|---|---|---|---|
| MFP_001 | ✓ | ✓ | |
| MFP_002 | | ✓ | |
| MFP_003 | | ✓ | ✓ |
| IWB_001 | | ✓ | ✓ |
| IWB_002 | | | ✓ |

A1

[Save] — B8

| Device ID | Package A [Settings] | Package B [Settings] | Package C [Settings] |
|---|---|---|---|
| MFP_001 | ✓ | ✓ | |
| MFP_002 | | ✓ | |
| MFP_003 | | ✓ | ✓ (hatched) |
| IWB_001 | | ✓ (hatched) | ✓ |
| IWB_002 | | | ✓ |

Error
! Cannot set license of Package B for IWB_001
! Cannot set license of Package C for MFP_003

[Save] (B8)

| | PACKAGE A | PACKAGE B |
|---|---|---|
| DEVICE ID | SETTINGS | SETTINGS |
| MFP_001 | ✓ | ✓ |
| MFP_002 | | ✓ |
| MFP_003 | | ✓ |

Dropdown M: MFP / IWB / All

SAVE

FIG. 21

| | PACKAGE A | PACKAGE B | PACKAGE C |
|---|---|---|---|
| DEVICE ID | SETTINGS | SETTINGS | SETTINGS |
| MFP_001 | ✓ | ✓ | ▩ |
| MFP_002 | | ✓ | ▩ |
| MFP_003 | | ✓ | ▩ |
| IWB_001 | ▩ | ▩ | ✓ |
| IWB_002 | ▩ | ▩ | ✓ |

SAVE

INFORMATION PROCESSING SYSTEM, SERVER, NON-TRANSITORY COMPUTER-READABLE MEDIUM, AND METHOD FOR CONTROLLING ASSIGNMENT OF LICENSE

CROSS-REFERENCE TO RELATED APPLICATIONS

This patent application is based on and claims priority pursuant to 35 U.S.C. § 119(a) to Japanese Patent Application Nos. 2019-046557, filed on Mar. 13, 2019 and 2020-034344, filed on Feb. 28, 2020, in the Japan Patent Office, the entire disclosures of which are hereby incorporated by reference herein.

BACKGROUND

Technical Field

The present disclosure relates to an information processing system, a server, a non-transitory computer-readable medium, and a method of controlling assignment of license.

Description of the Related Art

In the related art, services are provided to dedicated devices such as a multifunction peripheral (MFP), an interactive whiteboard (IWB), and a projector in various manners. For example, services are provided such that a user can use a desired function or functions only when the user needs such function(s). In order to use a service provided in the above-described manner, companies, institutions or the like have to purchase licenses of the desired service from a service sales company (distributor). The companies or the like allocate the purchased licenses to devices or users. Examples of the license for the service include a device license that specifies a device that can use the license and a user license that specifies a user who can use the license.

For example, a technique is known in which, when plural licenses exist for one application, two or more licenses are not allocated to one user.

On the other hand, services (applications, packages, functions, web services, etc.) are usually targeted to a particular type(s) of device. However, when managing licenses, if a service is simply associated with a target device, a license may be allocated to a device of a type that is not applicable to the service. The larger the number of types of devices, the more frequently this inappropriate allocation of license occurs.

SUMMARY

According to one or more embodiments, an information processing system includes at least one server and one or more devices communicable with the server through a network. The information processing system includes circuitry configured to: manage a service in association with a device type that can use the service; manage the devices in association with the device type, the devices each being a target device to which a license is to be allocated; and compare a device type associated with the target device to which the license is to be allocated with the device type associated with the service, to determine whether an allocation of the license of the service to the target device is permitted.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4-1 is a diagram illustrating a basic data model of data stored in the server, according to embodiments of the present disclosure;

FIG. 4-2 is a diagram illustrating a detailed data model of data stored in the server, according to embodiments of the present disclosure;

FIG. 4-3 is a diagram illustrating a detailed data model of data stored in the server, according to embodiments of the present disclosure;

FIG. 5 is a diagram illustrating an example of management information of a package managed by an application management unit, according to embodiments of the present disclosure;

FIG. 6 is a diagram illustrating an example of management information of a service definition managed by a license management unit, according to embodiments of the present disclosure;

FIG. 7 is a diagram illustrating an example of management information of a license definition managed by the license management unit, according to embodiments of the present disclosure;

FIG. 8 is a diagram illustrating an example of management information of a device definition managed by a device management unit, according to embodiments of the present disclosure;

FIG. 10 is a diagram illustrating an example of a package creation screen, according to embodiments of the present disclosure;

FIG. 11 is a diagram illustrating an example of a package information input screen, according to embodiments of the present disclosure;

FIG. 12 is a diagram illustrating an example of a license definition information input screen, according to embodiments of the present disclosure;

FIG. 14 is a diagram illustrating an example of a license purchase screen, according to embodiments of the present disclosure;

FIG. 15 is a diagram illustrating an example of a license allocation screen on which inputs are made, according to embodiments of the present disclosure;

FIG. 17 is a diagram illustrating an example of a notification indicating that a license allocation is not permitted, according to embodiments of the present disclosure;

FIG. 20 is a diagram illustrating an example of a license allocation screen, according to embodiments of the present disclosure;

FIG. 21 is a diagram illustrating another example of a license allocation screen, according to embodiments of the present disclosure;

Figure 1:
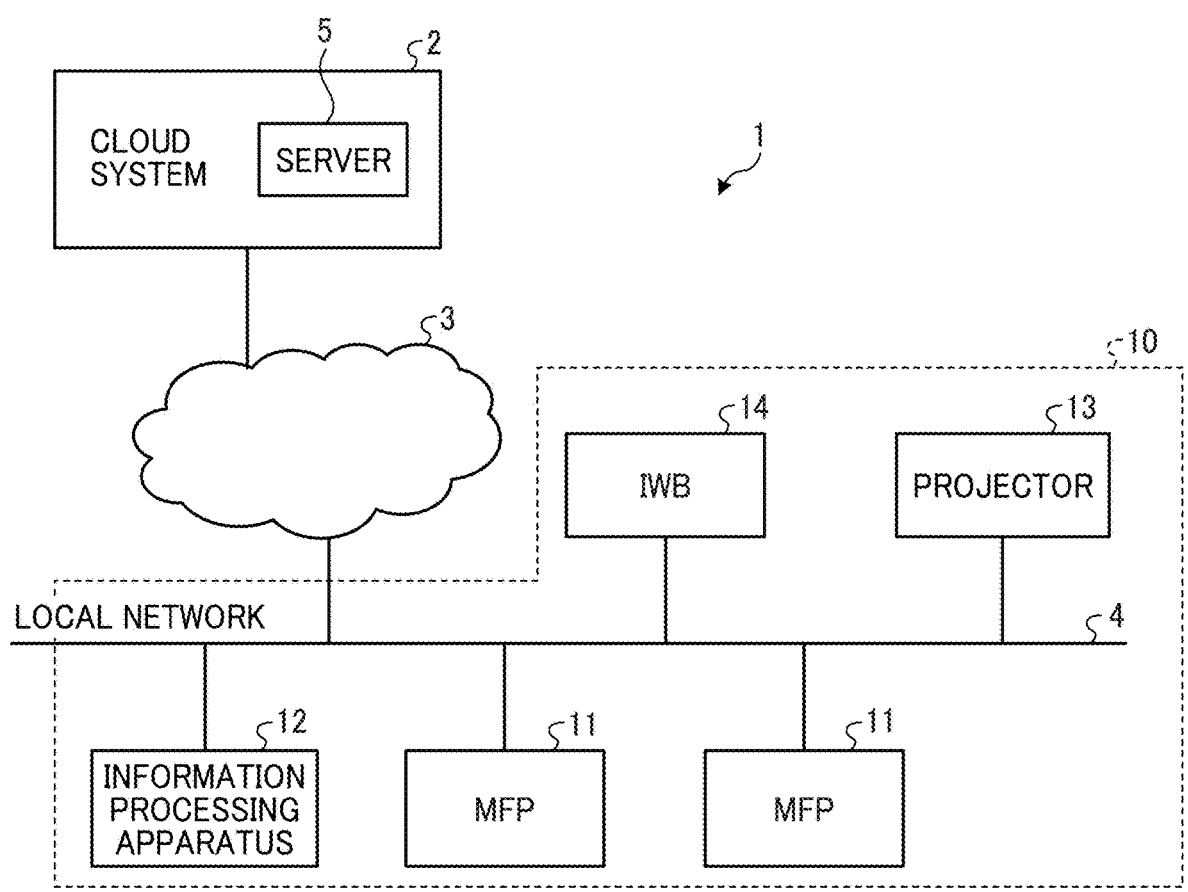
FIG. 1 is a diagram illustrating an example of a configuration of a system, according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of an information processing system, a server, a carrier medium, and a method of controlling assignment of license are described in detail with reference to the drawings.

First Embodiment

FIG. 1 is a diagram illustrating an example of a configuration of a system 1, according to a first embodiment. As illustrated in FIG. 1, the system (information processing system) 1 implements a cloud computing type service.

The system 1 includes a cloud system 2 and a plurality of types of devices 10. A network 3 such as the Internet and a local network 4 such as a local area network (LAN) connect the plurality of types of devices 10 to the cloud system 2.

Examples of the plurality of types of devices 10 connected to the cloud system 2 include a multifunction peripheral (MFP) 11, an information processing apparatus 12 such as a laptop personal computer (PC) and a tablet, a projector (PJ) 13, an interactive whiteboard (IWB; an electronic whiteboard having mutual communication capability) 14. The MFP 11 is an example of an image forming apparatus. However, these devices are just examples. The plurality of types of devices 10 includes any device such as a copier, a scanner, a facsimile, a camera, and a remote conference terminal, provided that it can receive service provision. Note that the MFP 11 is a device having a plurality of functions such as a copier function, a scanner function, a printer function, and a facsimile function.

Examples of the information processing apparatus 12 include a laptop PC and a tablet terminal, as described above. The information processing apparatus 12 is installed with a browser 120 functioning as a display unit. Alternatively, the information processing apparatus 12 may be installed with dedicated software for managing "license setting information", instead of the browser 120. As described below in detail, a tenant administrator who manages the plurality of types of devices 10 in a tenant such as a company, an office, and a store edits "license setting information" of the plurality of types of devices 10 using the browser 120 (or dedicated software). For example, the tenant administrator assigns a license or removes the assigned license. The term "tenant" refers to a unit by which the tenant administrator manages the plurality of types of devices 10. Two or more users may serve as the tenant administrator.

The cloud system 2 includes a server apparatus group configured by a plurality of servers 5. The number of the servers 5 illustrated in FIG. 1 is one example, and the number of servers 5 to be used is not limited to this example. In the example of FIG. 1, the MFP 11, the information processing apparatus 12, the projector 13 and the IWB 14 are illustrated as examples of the plurality of types of devices 10 included in the system 1, which functions as a client when viewed from the cloud system 2. However, the number and type of devices 10 included in the system 1 are not limited to this example, and any suitable number and type of devices may be provided.

As described below in detail, when a license of each package is assigned to each of the devices 10, a user of each of the devices 10 can use the package that resides in the server 5 (cloud system 2). The "license setting information" indicating which package license is allocated to which of the devices 10 is managed in the server 5 (cloud system 2). A description is given below of a detailed configuration of the server 5.

Figure 2:
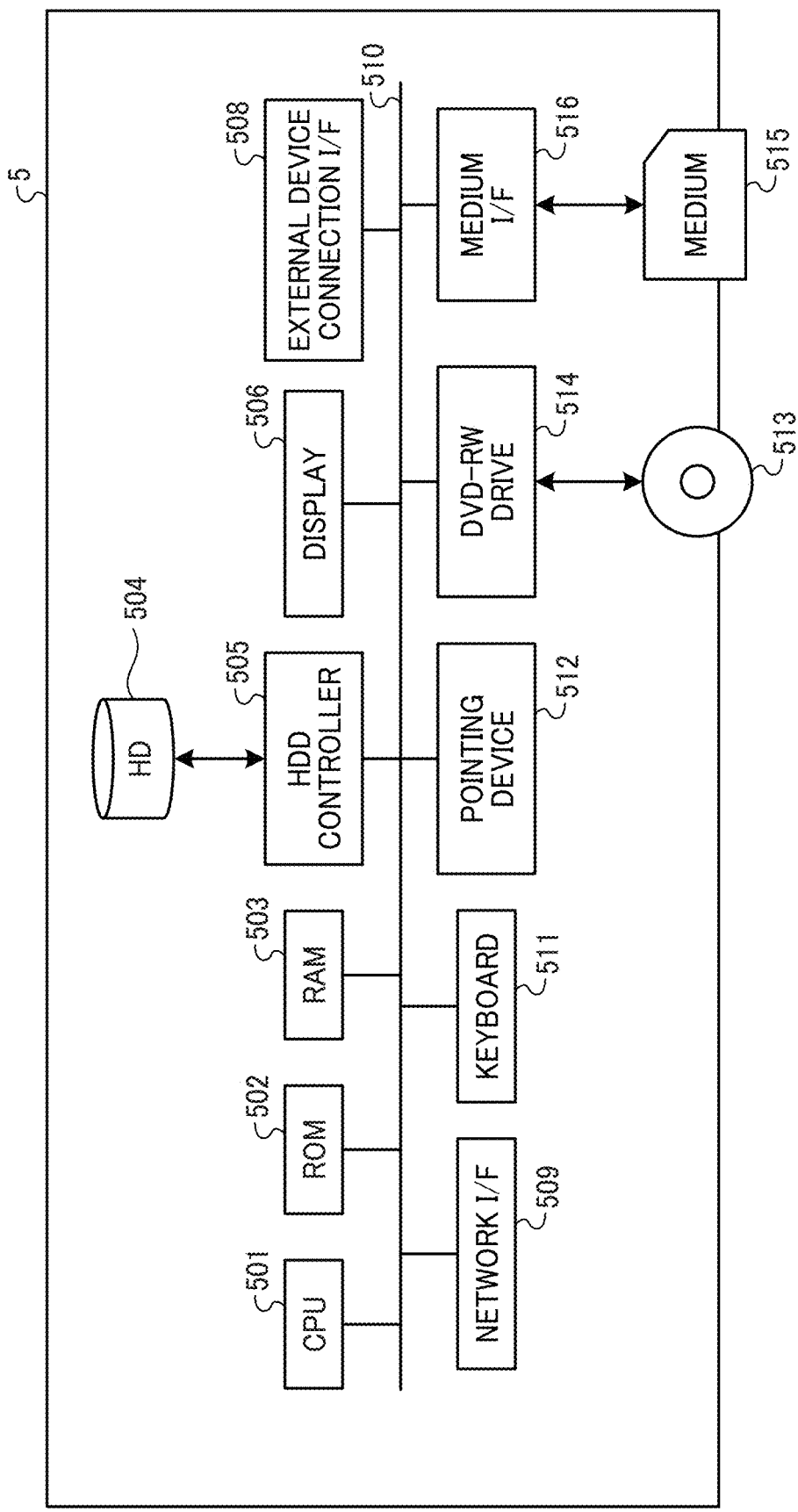
FIG. 2 is a block diagram illustrating an example of a hardware configuration of a server, according to embodiments of the present disclosure.

FIG. 2 is a block diagram illustrating an example of a hardware configuration of the server 5, according to embodiments. A description is now given of a hardware configuration of the server 5.

As illustrated in FIG. 2, the server 5 is implemented by a computer. The server 5 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, network I/F 509, a bus line 510, a keyboard 511, a pointing device 512, a digital versatile disc rewritable (DVD-RW) drive 514 and a medium I/F 516.

The CPU 501 controls entire operation of the server 5. The ROM 502 stores a control program such as an initial program loader (IPL) to boot the CPU 501. The RAM 503 is used as a work area for the CPU 501.

The HD 504 stores various data such as a control program. The HDD controller 505 controls reading and writing of various data from and to the HD 504 under control of the CPU 501.

The display 506 displays various information such as a cursor, menu, window, character, or image.

The external device connection I/F 508 is an interface that connects the computer as the server 5 to various external devices. Examples of the external devices include a universal serial bus (USB) memory and a printer.

The network I/F 509 is an interface that controls communication of data through the network 3 and the local network 4. The bus line 510 is, for example, an address bus or a data bus, which electrically connects the components such as the CPU 501 illustrated in FIG. 2.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed.

The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to a storage medium 515 such as a flash memory.

The program executed by the server 5 according to each embodiment can be stored in a computer readable storage medium, such as a compact disc read only memory (CD-ROM), a flexible disk (FD), a compact disc recordable (CD-R), and a digital versatile disk (DVD), in an installable or executable file format, for distribution.

Furthermore, the program executed by the server 5 according to each embodiment can be stored in a computer connected to a network such as the Internet and downloaded through the network. Further, the program executed by the server 5 according to each embodiment can be provided or distributed through a network such as the Internet.

A description is now given of functions implemented by the CPU 501 of the server 5 executing the program stored in the ROM 502 or the HD 504. Note that descriptions of conventionally known functions are omitted below. The characteristic functions implemented by the CPU 501 of the server 5 according to the present embodiment are described.

Figure 3:
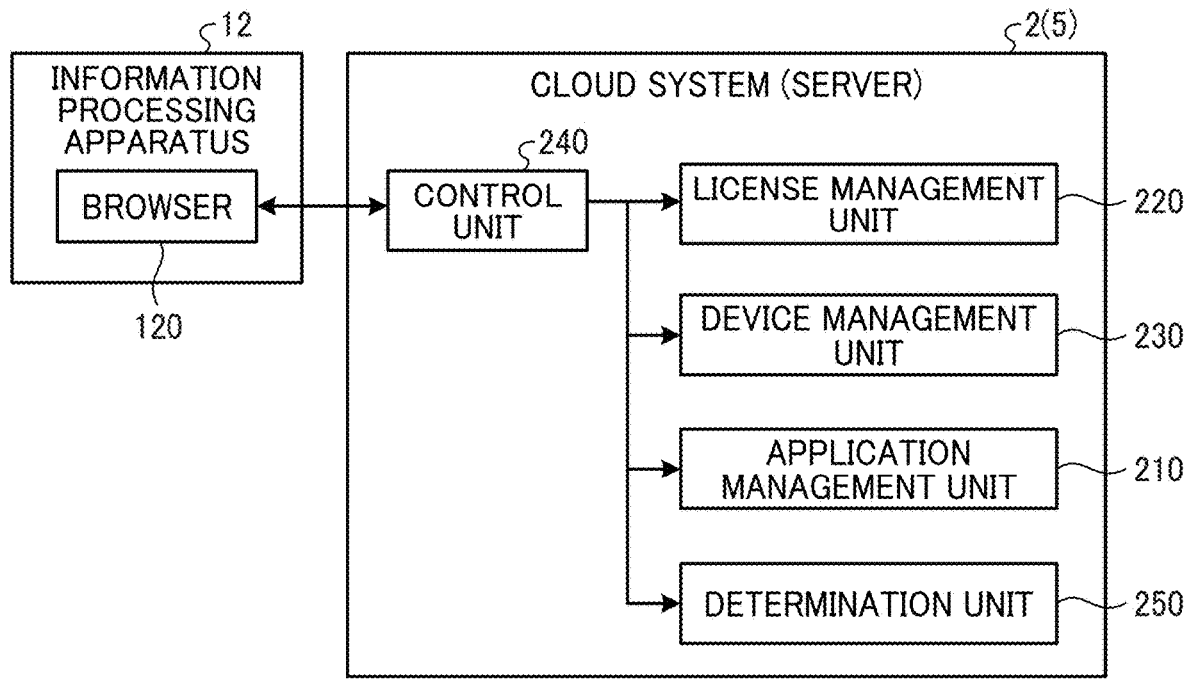
FIG. 3 is a block diagram illustrating an example of functions that the server includes, according to embodiments of the present disclosure.

FIG. 3 is a block diagram illustrating an example of functions that the server 5 includes. As illustrated in FIG. 3, the server 5 includes an application management unit 210, a license management unit 220, a device management unit 230, a control unit 240, and a determination unit 250. Although only the modules related to the present embodiment are illustrated in the example of FIG. 3, modules that the server 5 includes are not limited thereto. The modules (functional units) of the server 5 may be configured by a single apparatus, for example, as in the present embodiment. In another example, the modules (functional units) are configured by two or more apparatuses. For example, the license management unit 220, the device management unit 230, and the application management unit 210 may be provided respectively in different apparatuses.

The application management unit 210 manages management information and an entity of a package or an application. In this disclosure, the term "package" refers to is a bundle of a plurality of applications. The package is a unit of product sales. The number of applications included in the package can be one. In other words, the package includes one or more packages. In general, a unit of product sales is sometimes referred to as an "application", and therefore a package can be referred to as an "application". In this case, the term "application" refers to not only a set of executable programs operating on an apparatus and setting files of the programs, but also a set of a plurality of the applications. In order to use one or more applications included in the package on the device 10, the license of the package has to be assigned to the device 10. The application is an application that operates on the device 10. Alternatively, the application may a web application which operates on a server apparatus in response to a request for processing from the browser 120 of the device 10 to the server apparatus such as the server 5.

Figures 1, 4:
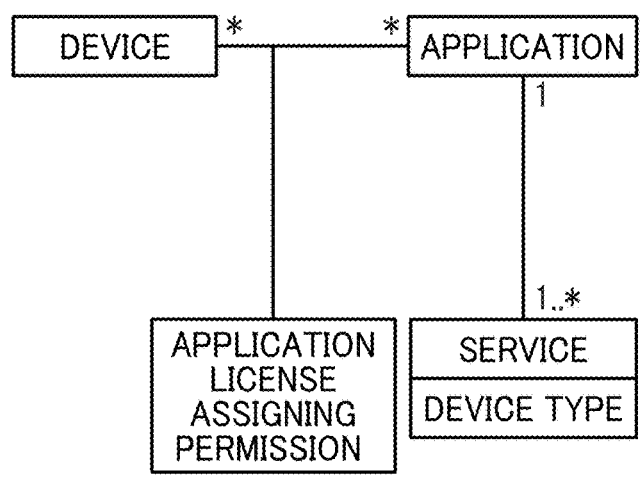
Figures 2, 4:
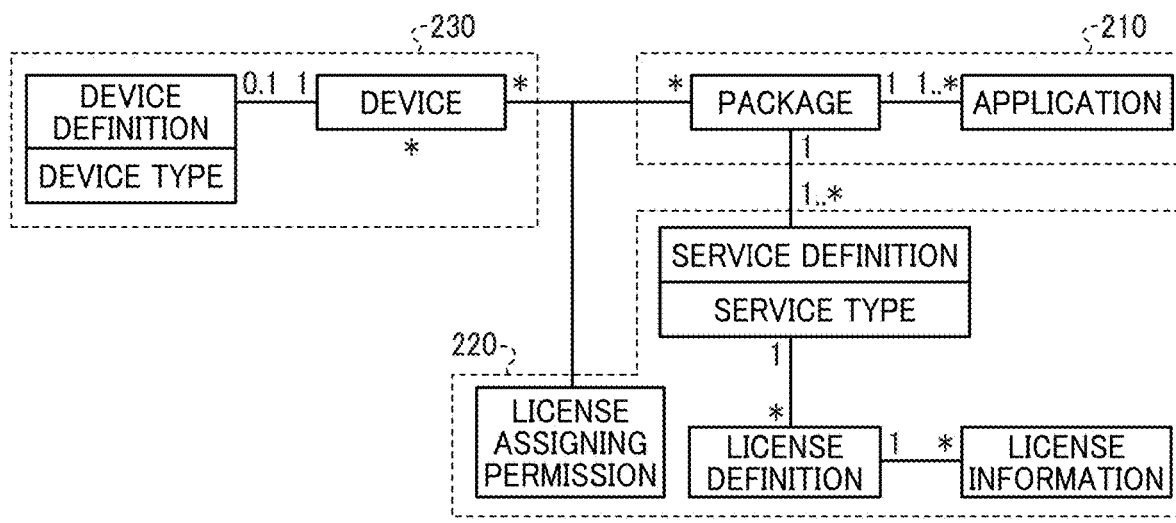
Figures 3, 4:
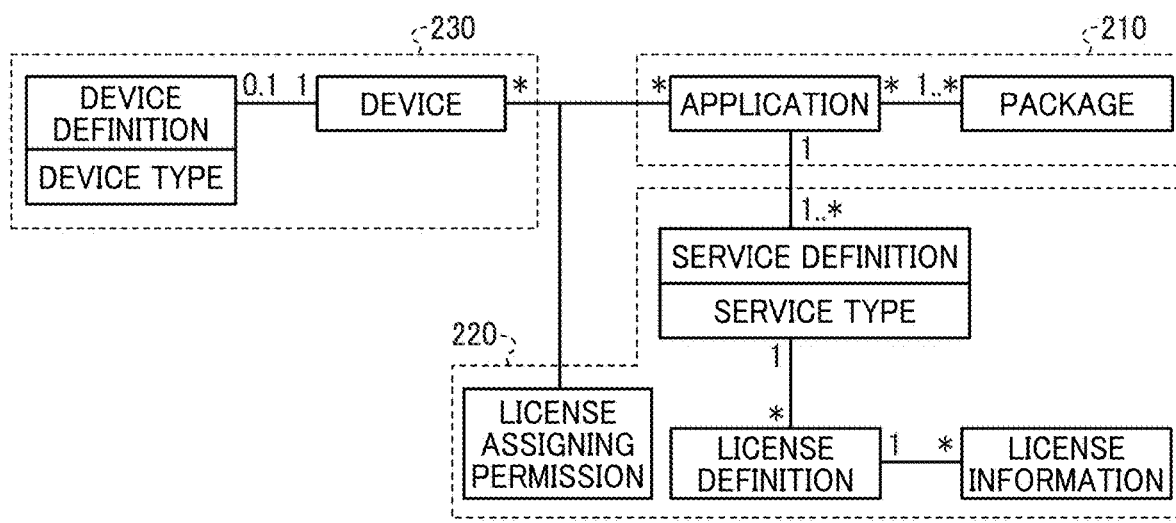

FIG. 4-1 is a diagram illustrating a basic data model of data stored in the server 5. The association between the device 10 and the application is associated with "application license assigning permission" indicating information on whether or not an assignment of license is permitted. The value of the "application license assigning permission" is determined based on whether the type of the device 10 such as the MFP 11 or the IWB 14 matches a device type associated with a service. The service is information that defines which kind of service is caused to be run by the application and on which type of device 10 the service can run.

FIG. 4-2 is a diagram illustrating a detailed data model of data stored in the server 5. As illustrated in the figure, each device is associated with a device definition described later as well as management information of a package licensed to the device. Further, each package is associated with an application well as management information of a service definition described below. Furthermore, the service definition is associated with management information of a license definition described later.

FIG. 4-2 illustrates an example in which the device definition and a service type are associated with the package. Alternatively, the device definition and the service type may be associated with an application, as illustrated in FIG. 4-3. In this case, although the sales unit is basically a package, the license assigning permission can be determined in units of an application, which is more detailed manner than illustrated in FIG. 4-2.

FIG. 5 is a diagram illustrating an example of management information of a package managed by the application management unit 210. As illustrated in FIG. 5, the application management unit 210 manages, for each package, a package ID, a package name, a package description, a service class, an application list, etc.

The package ID is an identifier (ID) for identifying a package. The package name is a name of the package. The package description is a description of the package. The service class is information for associating the package with a service definition described later. The application list is a list of applications included in the package.

The license management unit 220 sets and holds a service definition including the device types of the plurality types of devices 10 and a license definition. In addition, the license management unit 220 determines whether a license can be assigned based on a relation between the device 10 and the package. Further, the license management unit 220 performs a process of allocating a license to the device 10.

The service definition is information indicating what kind of service is provided by the package, and includes a device type, a name, a uniform resource locator (URL), and an available language. The device type indicates on which device 10 the service can operate.

The license definition is information that defines how to purchase a license. The license information is issued by inputting specific values such as a use start date and a scheduled expiration date in the license definition. The license information is the entity of the purchased license.

FIG. 6 is a diagram illustrating an example of management information of the service definition managed by the license management unit 220. As illustrated in FIG. 6, the license management unit 220 manages a service class, a service name, a service description, a service type, the presence or absence of a license assigning permission, a device type, etc., as the service definition. The license assigning permission is information indicating whether a license can be assigned in view of the relation between the device 10 and the package.

The service class is an ID for identifying the service definition. The service name is a name of the service, and the same value as the package name is set. The service description is a description of the service, and the same value as the description of the package is set. The service type is a type of the service, and is information indicating what kind of service it is.

In the presence or absence of the license assigning permission, a value indicating whether or not a license can be assigned. When the license can be assigned, the value "Yes" is set. When the license cannot be assigned, the value "No" is set. When the value "Yes" is set, the license definition described below has to be created.

In the device type, one or more devices that can use the corresponding service, such as the MFP 11, the projector 13, and the IWB 14, are set.

FIG. 7 is a diagram illustrating an example of management information of the license definition managed by the license management unit 220. As illustrated in FIG. 7, the license management unit 220 manages a license code, a license name, a license type, an expiration date, a service class, a device type, etc., as the license definition.

The license code is an ID for identifying the license definition. The license name is a name of the license definition.

The license type indicates a kind of license. The kind of license includes a user license (a license that limits the maximum number of users who can use the service) and a device license (a license that limits the maximum number of devices that can use the service). Note that the maximum number of users or devices is not included in the license definition because the number is set when a license is issued.

The expiration date is an expiration date of the license. The expiration date is set to an indefinite period, months, or days.

The service class is information for associating the license definition with the service definition.

In the device type, one or more devices that can use the corresponding service, such as the MFP 11, the projector 13, and the IWB 14, are set.

The device management unit 230 registers and manages device information of all the devices 10, each being a target of license management. The device information is information on the devices 10 to be managed. The device information includes a serial ID, a device type, etc.

Although in the present embodiment, the description described above is of the case in which the device type is included in the management information of the service definition and the management information of the license definition, in another example, the management information of the package can also include the device information.

FIG. 8 is a diagram illustrating an example of management information of the device definition managed by the device management unit 230. As illustrated in FIG. 8, the device management unit 230 manages a serial ID, a device type, etc., as the device definition.

The serial ID is an individual identification information (ID) held by a main unit of the device. The device type is a type of the device, such as the MFP 11, the projector 13, and the IWB 14.

The control unit 240 transmits various information to the browser 120 installed in the information processing apparatus 12, to cause the browser 120 to display a license allocation screen described below.

When allocating a license to a device, the determination unit 250 compares a device type associated with the device as a license allocation target with a device type associated with a service, to determine whether the license of the service can be allocated to the device as the license allocation target.

A description is now given of a registration process of various information (package, service definition, license definition) performed when creating a package.

Figure 9:
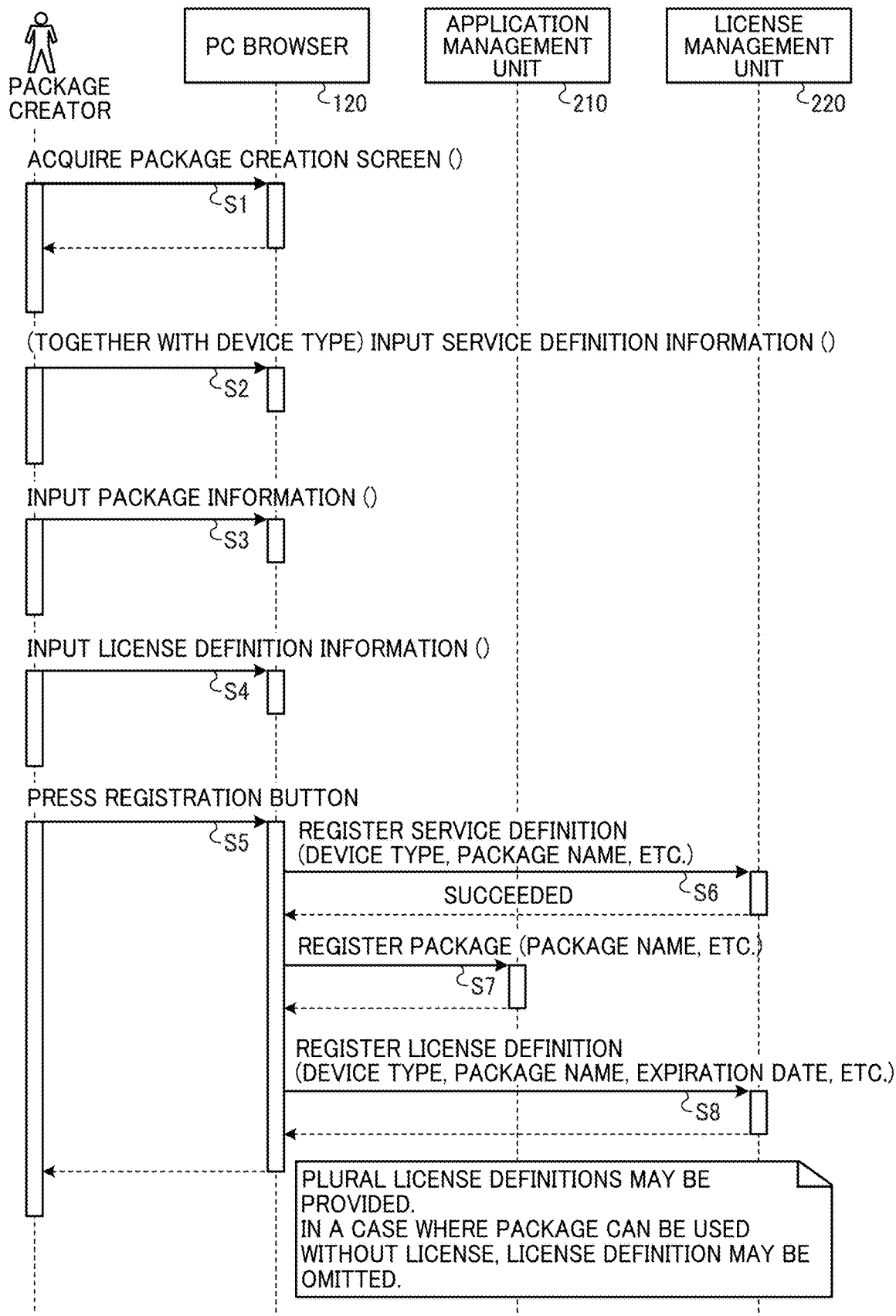
FIG. 9 is a sequence diagram illustrating a registration process of various information to be performed when creating a package, according to embodiments of the present disclosure.

FIG. 9 is a sequence diagram illustrating a registration process of various information (package, service definition, license definition) to be performed when creating a package. As illustrated in FIG. 9, in response to a request for acquiring a package creation screen from a package creator, the browser 120 of the information processing apparatus 12 acquires the package creation screen from the server 5 and displays the package creation screen acquired from the server 5 (step S1).

FIG. 10 is a diagram illustrating an example of a package creation screen P1. The package creation screen P1 illustrated in FIG. 10 is displayed on the browser 120 of the information processing apparatus 12. The package creator enters various definition information on the package creation screen P1. Examples of the various information entered by the package creator on the package creation screen P1 includes a service name, a service overview, a package name, a license control, and a device type.

The service name is a name of the service. The service name is a unique value on the system.

The service overview is a description about the service.

The package name is a product name used when selling a product (package) including one or more services.

For the license control, radio buttons for selecting one of "valid" and "invalid" are provided. When "valid" is selected, the license control indicates that the service cannot be used unless a license is assigned. When "invalid" is selected, the license control indicates that the service can be used without a license assignment.

The device type is an item for receiving selection of one or more types of a device (MFP, IWB, projector, videoconference system, camera, tablet) on which the package can operate. That is, the license of the package as a setting target on the package creation screen of FIG. 10 can be assigned to the device of one or more types selected in this device type field. When "all" is selected (a mark is put in a check box labeled with "all"), it means that marks are put in checkboxes corresponding to not only all the current device types but also a device type(s) newly added in the future. Therefore, it is determined that a device of a newly added device type can use the package as the setting target, and the license can be allocated to the device of the newly added device type.

The package creator enters service definition information including the device type on the package creation screen P1 (step S2).

Specifically, the package creator enters information indicating on which device the target package can operate by selecting a desired device type. The package creator can select a plurality of device types. In a case where no information of the device type is entered, a default value can be set. One example of the default value indicates that the target package operates on the devices of all types. Another example of the default value indicates that the target package operates on the devices of neither one of types. When the package is created mainly for the MFP, the default value of the device type can be set to the MFP. In addition, the device type information can add an element after the registration. For example, the IWB can be added after the registration of the MFP.

When a "Next" button B1 is pressed on the package creation screen P1, a screen displayed by the browser 120 of the information processing apparatus 12 transitions to a package information input screen.

FIG. 11 is a diagram illustrating an example of a package information input screen P2. The package information input screen P2 illustrated in FIG. 11 is displayed on the browser 120 of the information processing apparatus 12. The package creator enters various information on the package information input screen P2.

The package creator registers one or more applications to be included in the target package on the package information input screen P2.

An application name field provided on the package information input screen P2 is a field for entering characters as a search key. The package creator enters a desired characters as a search key in the application name field and presses a "Search" button B5. Thus, one or more application to be included in the target package are retrieved.

After retrieving one or more applications to be included in the target package, the package creator presses a "Register" button B2 corresponding to an application that the creator wants to include in the target package. This, the desired application to be included in the target package is registered. When the registration of the desired application to be included in the target package is completed, the "Register" button B2 is switched to an indication "Registered". When a "Deregister" button B4 provided on the package information input screen P2 is pressed after the registration of the information regarding the package, the registration of the package associated with the "Deregister" button B4 is deregistered, and the "Register" button B2 is displayed in association with the deregistered application. Searching for an application name as described above is just one example of operation for specifying a desired application to be included in the target package. A desired application to be included in the target application can be specified in any suitable manner, provided that the browser 120 can receive the specification of the application from the package creator. For example, the browser 120 receives specification of an application by receiving an input of an application identification number from a user.

The package creator enters information regarding the package on the package information input screen P2 (step S3).

When a "next" button B3 on the package information input screen P2 is pressed after the information regarding the package is registered, a screen displayed by the browser 120 of the information processing apparatus 12 transitions to a license definition information input screen.

FIG. 12 is a diagram illustrating an example of a license definition information input screen P3. The license definition information input screen P3 illustrated in FIG. 12 is displayed on the browser 120 of the information processing apparatus 12. The package creator enters various definition information on the license definition information input screen P3. The various definition information that the package creator enters on the license definition information input screen P3 is a package name, a license name, a validity period, a license type, a charge category, and a unit price for each device type.

The package name is the name of the package entered on the package creation screen P1.

The license name is a name of the license. When plural license definitions are defined for one package, the license name is a character string unique within one package.

The validity period is a period during which the license is valid from the start date after purchasing the license. The validity period can be an indefinite period, and a radio button for selecting the indefinite period is also provided.

As the license type, a license allocation type (device or user) is selected. When the device is selected as the license type, a license allocation target is a device. In this case, a usage license is allocated to each device that executes an application. When the user is selected as the license type, a license allocation target is a user. In this case, a usage license is allocated to each user who uses an application from a device.

For the charge category, radio buttons for selecting one of "Sale (Charge occurs) and "Demonstration (No charge)" are provided. When "Sales (Charge occurs)" is selected, billing information such as a unit price for each device type or a unit price for each user is to be entered.

After entering the license definition information on the license definition information input screen P3 (step S4), the package creator presses the "Register" button B6 on the license definition information input screen P3 (step S5).

When the "Register" button B6 on the license definition information input screen P3 is pressed, the license management unit 220 registers the service definition (the device type, service name, etc.) entered via the browser 120 (step S6).

When the "Register" button B6 on the license definition information input screen P3 is pressed, the license management unit 220 registers information (the package name, etc.) regarding the package entered via the browser 120 (step S7).

When the "Register" button B6 on the license definition information input screen P3 is pressed, the license management unit 220 registers the license definition (the device type, license name, validity period, etc.) entered via the browser 120 (step S8).

Although in the present embodiment, the description given above is of an example in which the device type is registered in the service definition and the license definition, the embodiment is not limited thereto. In another example, the device type can be registered only in the service definition.

Note that a plurality of license definitions can be provided. In a case in which the package is permitted to be used without a license, the license definition can be omitted.

The description given heretofore is of a role of the package creator.

A description is now given of a license allocation process.

Figure 13:
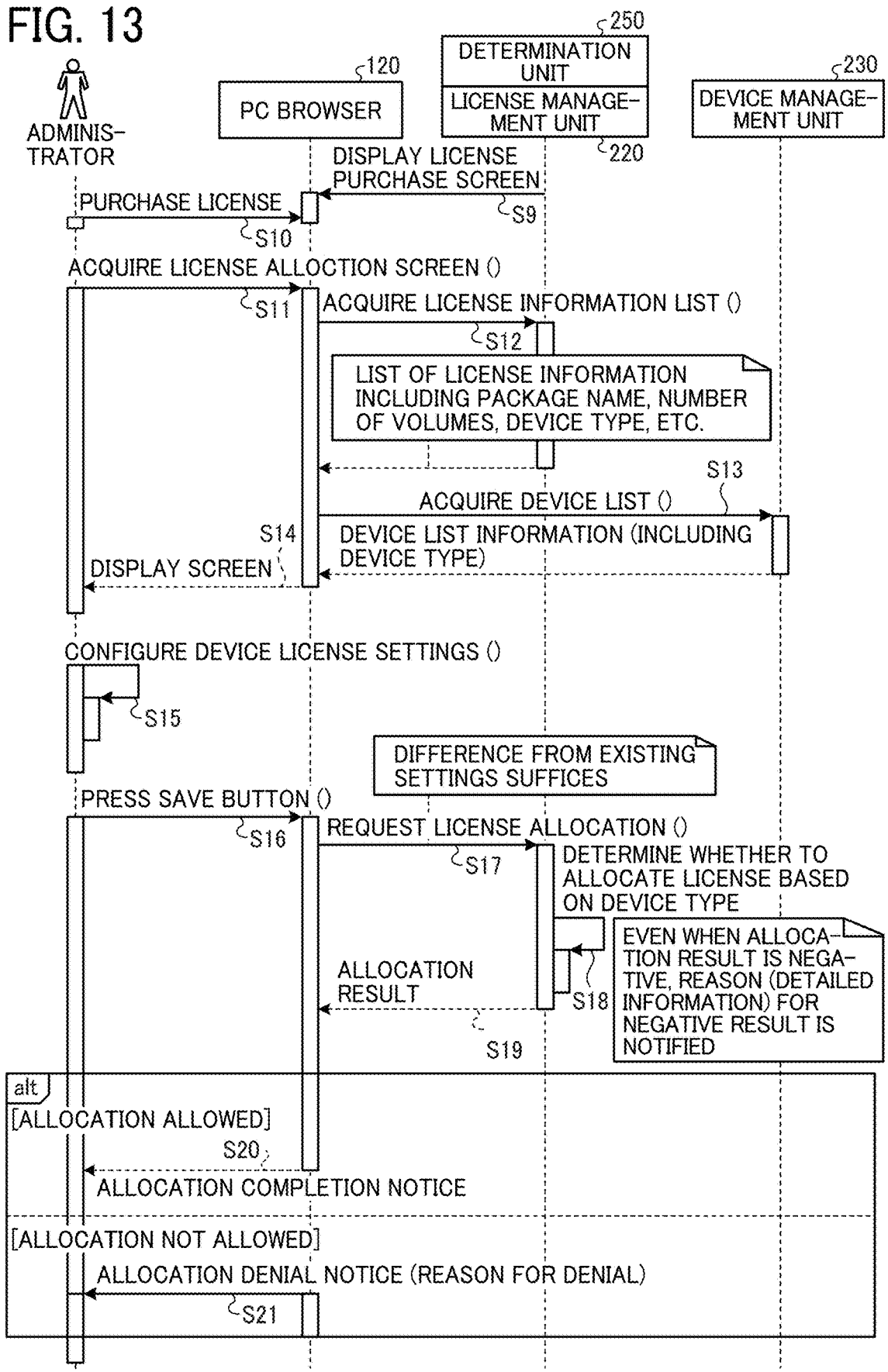
FIG. 13 is a sequence diagram illustrating a license allocation process, according to embodiments of the present disclosure.

FIG. 13 is a sequence diagram illustrating a license allocation process. A person (a tenant administrator or a user) who wants to use an application causes the browser 120 of the information processing apparatus 12 to display a user interface (license purchase screen) for purchasing a license as illustrated in FIG. 13 (step S9), and purchase a license (step S10).

FIG. 14 is a diagram illustrating an example of a license purchase screen P4. The license purchase screen P4 illustrated in FIG. 14 is displayed on the browser 120 of the information processing apparatus 12. The license purchase screen P4 is a screen that receives inputs of a product name, a license, a unit price, a quantity, and a start date. On the license purchase screen P4, a person (a tenant administrator or a user) who wants to use an application selects a desired product name (package name) and a desired license, and enters a desired quantity. The unit price is displayed when the desired license is selected.

In one example, for the quantity, radio buttons for selecting one of specifying for each device type and specifying collectively regardless of the device type can be provided. In this case, the person (a tenant administrator or user) who wants to use the application can specify the quantity for each device type (device type) or specify the quantity collectively (regardless of the device type). When the specifying for each device type is selected, the browser 120 of the information processing apparatus 12 displays input items that allow the user or the tenant administrator to specify the quantity for each device, as illustrated in FIG. 14. Further, the person (user) who wants to use the application enters a start date of the license to be purchased, and presses a "Purchase" button B7.

After the registration process illustrated in the sequence diagram of FIG. 9 is performed, when a license of each package is purchased, "license information" is generated. The license information is the entity of the purchased license. For example, when the license information indicates that the volume is equal to 5, licenses can be assigned to up to five devices.

Although not described in the above with reference to the registration process illustrated in FIG. 9, the tenant administrator sends the device management unit 230 a list of devices to be managed in addition to the information on the package, the service definition, and the license definition. This allows the device management unit 230 to manage the device list for each tenant.

A description is given hereinafter of the license allocation process.

In response to receiving a request for acquiring a license allocation screen from the tenant administrator (step S11), the browser 120 of the information processing apparatus 12 acquires a license information list from the license management unit 220 (step S12). The license information list is a list of license information including a package name, the number of volumes, the device type, and the like.

Further, the browser 120 acquires device list information including the device type from the device management unit 230 (step S13). The device list information is a list of devices associated with a tenant to which the tenant administrator belongs. For example, the device list information includes, the device ID of the device 10 (e.g., MFP_001), a model name, a location where the device is provided.

Next, the browser 120 displays a license allocation screen P5 as illustrated in FIG. 15 (step S14).

The tenant administrator configures settings of the device license on the license allocation screen P5 (step S15), and presses a "Save" button B8 on the license allocation screen P5 after configuring the settings (step S16).

FIG. 15 is a diagram illustrating an example of the license allocation screen P5 on which inputs are made by the user or the tenant administrator. As illustrated in FIG. 15, the license allocation screen P5 displays, for each tenant, a list associating the service corresponding the license information of the license purchased in S10 and the device types that can use the service with each other. The license allocation screen P5 includes an input area A1 having a table format. The row heading includes a list of packages, and the column heading includes a list of device IDs of the devices 10. The tenant administrator puts a check mark in a cell corresponding to a combination of a desired package and device 10, to select a desired device(s) 10 to which a license is to be allocated for each package.

When the configuration of settings of the device license is completed, the browser 120 sends a request for a license allocation to the license management unit 220 (step S17).

In response to receiving the request for license allocation, the determination unit 250 compares the device type corresponding to each package stored in the server 5 with the device type of each device to determine whether a license allocation is to be permitted (step S18). The determination unit 250 sends a notification indicating the allocation result to the browser 120 (step S19).

Although in the present embodiment, the description given above is of a case in which the determination unit 250 determines whether the allocate of license is permitted based on the device type (step S18), the embodiment is not limited thereto. In another example, the browser 120 of the information processing apparatus 12 can determine whether the allocation of license is permitted based on the device type.

Figure 16:
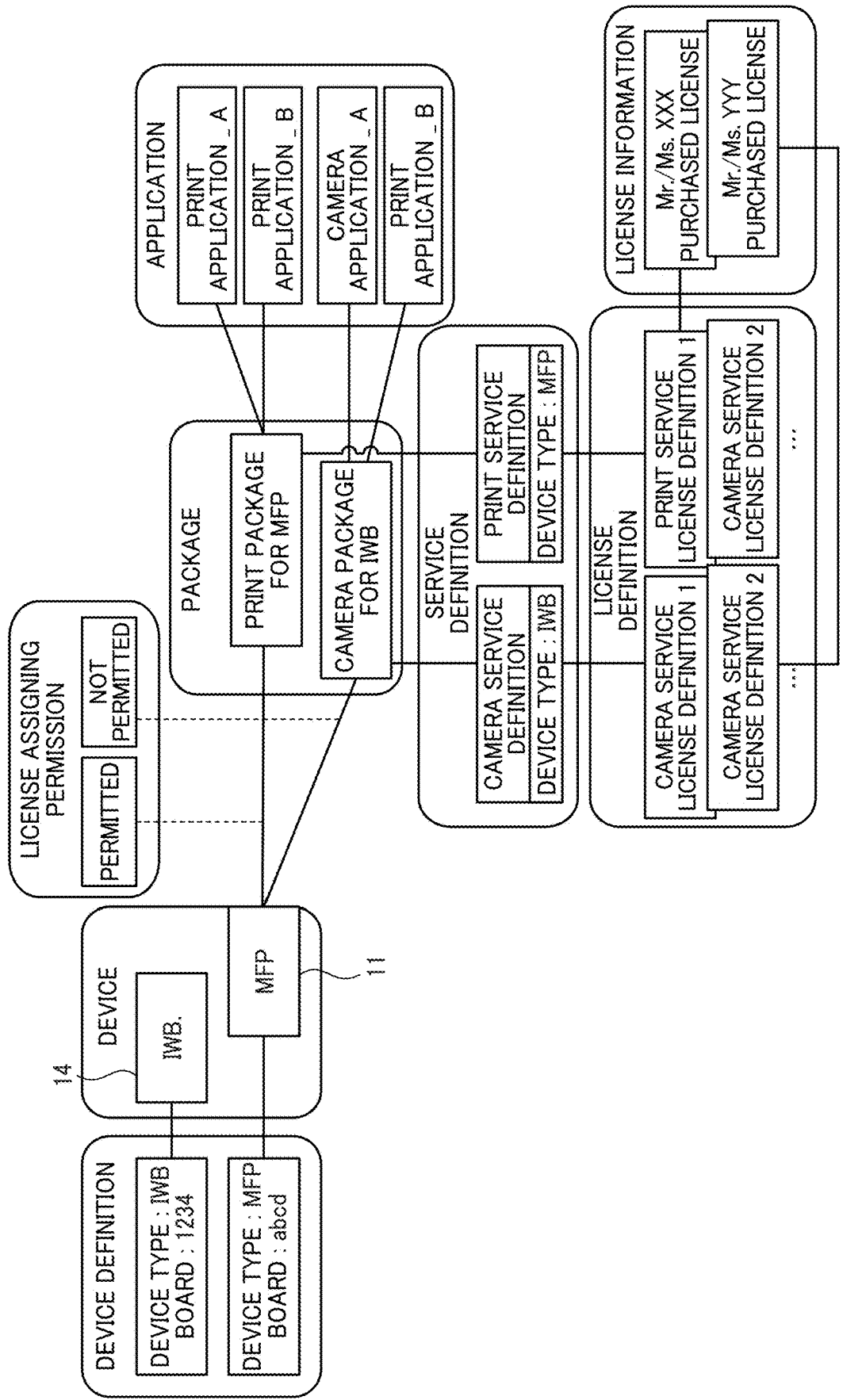
FIG. 16 is a diagram illustrating an example of an instance for a data model, according to embodiments of the present disclosure.

FIG. 16 is a diagram illustrating an example of an instance for a data model. FIG. 16 illustrates an example case in which a user can use an MFP print package and an IWB camera package in an environment (tenant) to which the MFP 11 and the IWB 14 belong as the devices 10.

In the relation between the MFP 11 and the print package for the MFP, the device type of the device information of the MFP 11 is 'MFP", and the device type of the service definition of the print package for the MFP is 'MFP', and therefore the device types match with each other. Accordingly, the license assignment permission is set to "Permitted".

By contrast, the device type of the MFP 11 is 'MFP' and the device type of the IWB camera package is 'IWB', and therefore the device types do not match with each other. Accordingly, the license assignment permission is set to "Not Permitted".

Conversely, in the relation between the IWB 14 and the camera package for IWB, the license assignment permission is set to "Permitted", while in the relation between the IWB 14 and the print package for the MFP, the license assignment permission is set to "Not Permitted".

As described above, in the license allocation determination, when the allocation result is "No" because the license assignment permission is "Not Permitted", the license management unit 220 transmits a notification including the reason for the negative result.

When the allocation result is "Yes", the browser 120 displays a notification indicating that the license allocation is completed (step S20).

By contrast, when there is an item for which the allocation result is "No", the browser 120 displays a notification indicating that the license allocation is not permitted including the reason. FIG. 17 is a diagram illustrating an example of the notification indicating that the license allocation is not permitted. As illustrated in FIG. 17, the item for which for the allocation result is "No" is highlighted (for example, shaded), and a message indicating a reason for the negative result such as "Cannot set license of package B to IWB" is displayed.

As described heretofore, according to the present embodiment, allocating to a device a license that the device that cannot use is avoided. In other words, when the tenant administrator collectively registers package licenses to devices using a PC browser or the like, a drawback is avoided that the license is allocated to a device that cannot use the package and accordingly license resources are wasted.

Further, according to the present embodiment, a service such as an application and a package is prevented from being erroneously installed on a device of an unexpected type, and thereby preventing a malfunction from occurring. Accordingly, adverse effects on devices and cloud systems are avoided.

Although in the present embodiment, the description given above is of an example case in which a package is applied as a service, the embodiment is not limited thereto. The present embodiment can be applied to various applications, various functions, web services, and the like.

Figure 18:
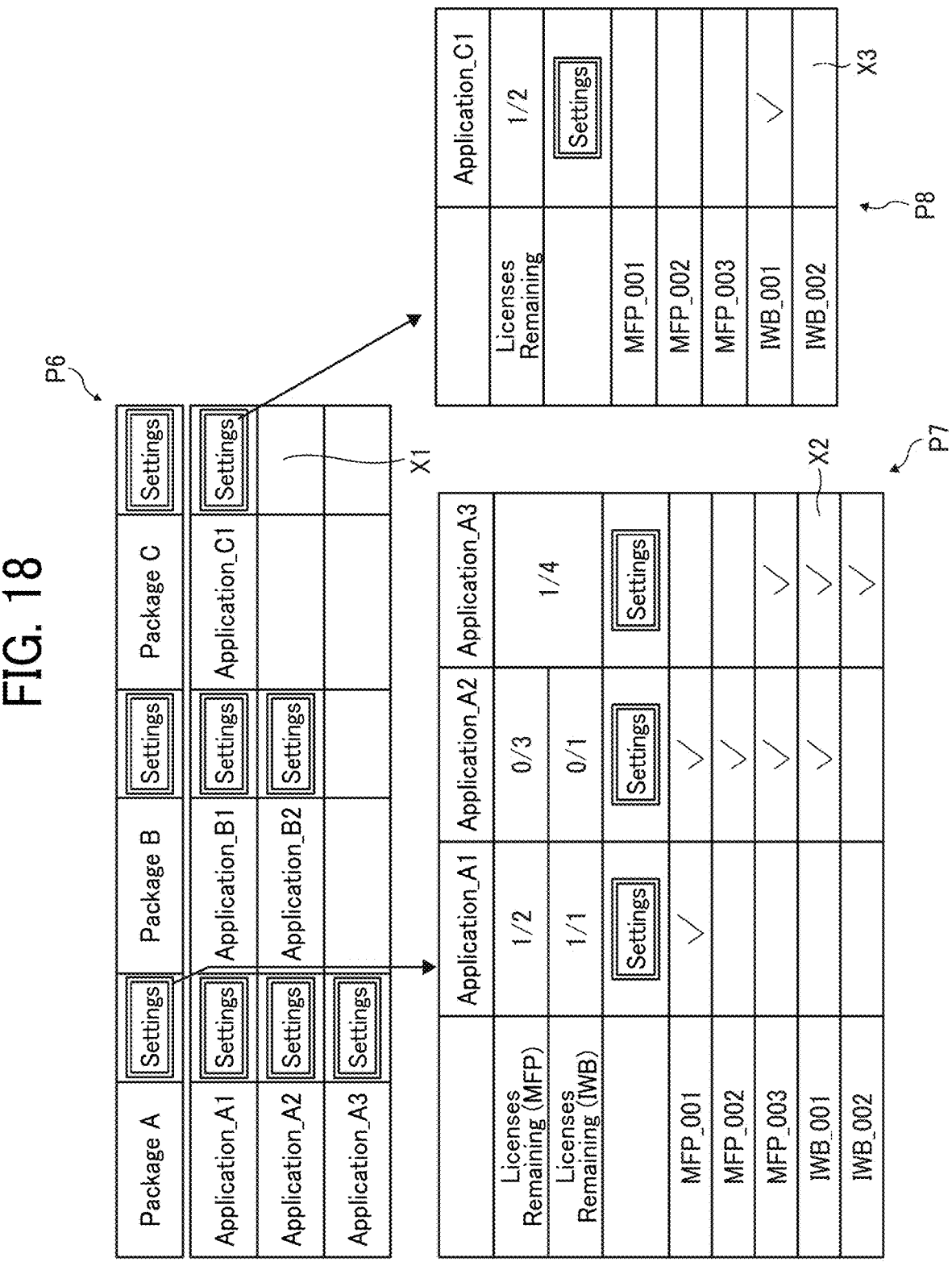
FIG. 18 is a diagram illustrating another example of a license allocation screen on which inputs are made, according to embodiments of the present disclosure.

FIG. 18 is a diagram illustrating another example of a license allocation screen P6 on which inputs are made by the user or the tenant administrator. The license allocation screen P6 in the example illustrated in FIG. 18 has a list X1 having a table format, for each tenant, and displays a list of packages in the row headings and displays a list of the applications included in each package in the columns. The tenant administrator selects a desired package or application for which a license is to be set from the list X1.

When the tenant administrator selects a desired package as a license setting target, the screen transitions to a license allocation screen P7. The license allocation screen P7 is displayed by the browser 120. The license allocation screen P7 includes an input area X2 having a table format. The row heading includes a list of applications included in the selected package, and the column heading includes a list of device IDs of the devices 10. The tenant administrator puts a check mark in a cell corresponding to a combination of a desired application included in the package and the device 10, to select a desired device(s) 10 to which a license is to be allocated for each application included in the package.

Further, in another example, the browser 120 can display a remaining license indication in the input area X2 of the license allocation screen P6 based on the license information of the license purchased in S10 and the number of allocated licenses. In the remaining license indication, the denominator indicates the total number of licenses to be allocated and the numerator indicates the number of licenses that have been already allocated. Note that when "Specify for each device type" is selected when purchasing the license on the license purchase screen P4, for example, the remaining license indication can be presented for each device type.

In the example of FIG. 18, the remaining license (MFP) and the remaining license (IWB) are displayed collectively for Application_A3 in the input area X2. This means that when purchasing the licenses in S10, the license quantity is not specified for each device type, and the licenses for the MFP and the licenses for the IWB licenses are purchased collectively.

On the other hand, when the tenant administrator selects an application as a license setting target, the browser 120 causes the screen to transition to a license allocation screen P8. The license allocation screen P8 includes an input area X3 having a table format. The row heading includes a list of the selected applications, and the column heading includes a list of device IDs of the devices 10. The tenant administrator puts a check mark in a cell corresponding to a combination of a desired application and device 10, to select a desired device 10 to which a license is to be allocated for each application.

Further, in the input area X3 of the license allocation screen P8, the browser 120 can display a remaining license indication. Note that when "Specify for each device type" is selected when purchasing the license on the license purchase screen P4, for example, the browser 120 can display the remaining license indication for each device type.

Second Embodiment

Hereinafter, a description is given of a second embodiment.

The second embodiment is different from the first embodiment in that, in the license allocation process, the browser 120 determines whether or not a licenses allocation is permitted. In other words, the browser 120 functions as the determination unit. In the second embodiment, the elements, functions, processes, and steps that are the same or substantially the same as those described in the first embodiment are denoted by the same reference numerals or step numbers, and redundant descriptions thereof are omitted below. A description is given of the differences from the first embodiment.

Figure 19:
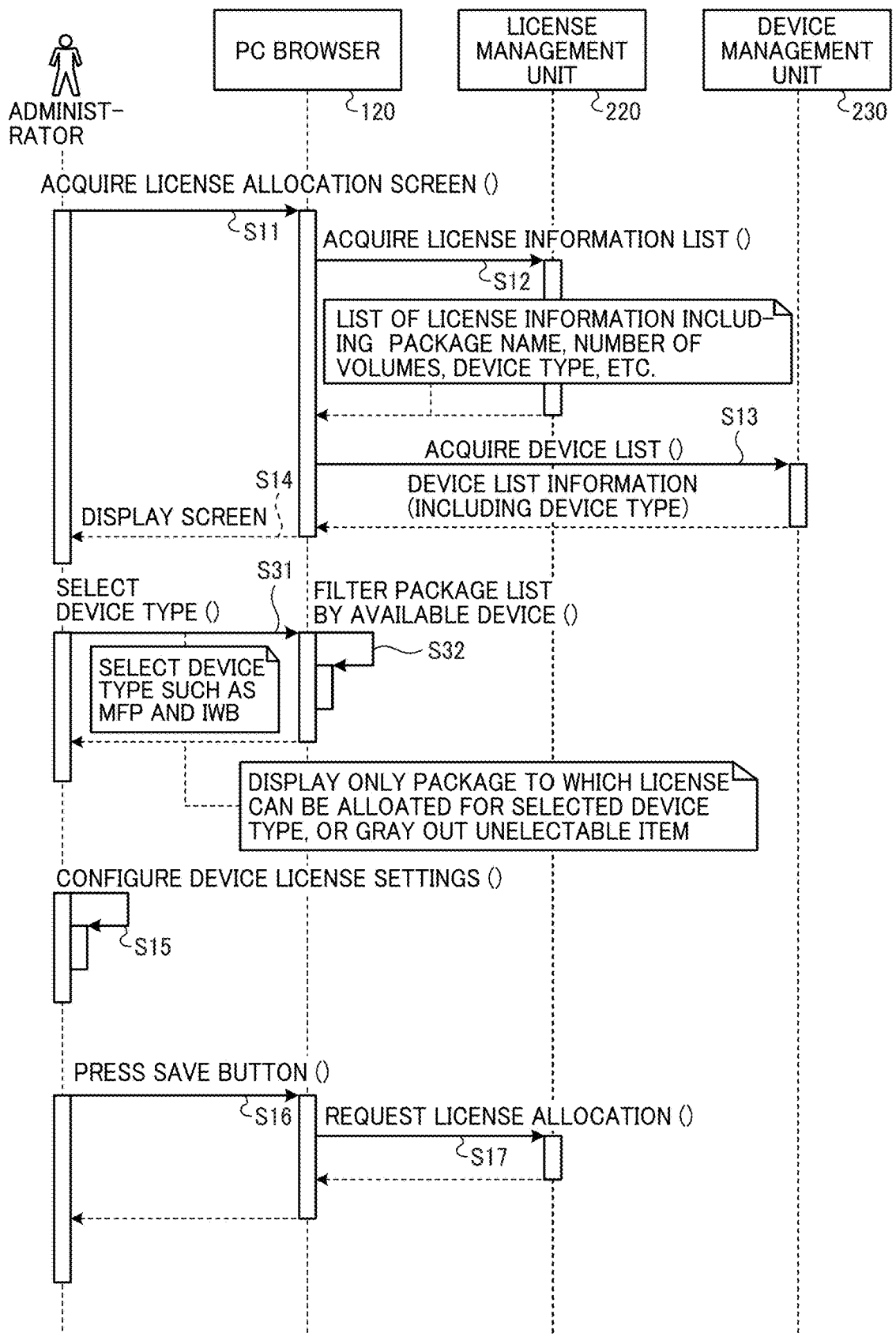
FIG. 19 is a sequence diagram illustrating a license allocation process, according to the second embodiment of the present disclosure.

FIG. 19 is a sequence diagram illustrating a license allocation process, according to the second embodiment. As illustrated in FIG. 19, the browser 120 displays a license allocation screen (step S14). The tenant administrator selects a device type such as an MFP or an IWB on the license allocation screen (step S31).

In response to receiving the selection of the device type from the tenant administrator, the browser 120 performs filtering on a package list using the selected device type as a filtering key, to extract a package(s) that the devices 10 corresponding the selected device type can use (step S32).

FIG. 20 is a diagram illustrating an example of a license allocation screen P9. As illustrated in FIG. 20, the license allocation screen P9 includes a pull-down menu M used for selecting a device type such as the MFP and the IWB. The license allocation screen P9 further includes an input area A1 having a table format. The row heading includes a list of packages, and the column heading includes a list of device IDs of the devices 10 corresponding to the device type selected in the pull-down menu M. The tenant administrator puts a check mark in a cell corresponding to a combination of a desired package and device 10, to select a desired device(s) 10 to which a license is to be allocated for each package. In the pull-down menu M, a plurality of devices can be selected.

As illustrated in FIG. 20, the browser 120 extracts and displays only a package(s) corresponding to a device type that matches the device type of the device 10 selected in the pull-down menu M. In a case where there is no package corresponding to a device type that matches the device type of the device 10 selected in the pull-down menu M, the browser 120 can display "No target device", for example. Further, the browser 120 may display a pull-down menu as illustrated in FIG. 20 and display the device ID(s) of the device 10 corresponding to the selected device type even in a case where the server determines whether a license allocation is permitted as in the first embodiment, and display only the selected device.

FIG. 21 is a diagram illustrating another example of a license allocation screen P10. As illustrated in FIG. 21, the browser 120 display a license allocation screen P10 in which a combination of a package and the device 10 for which license allocation is no permitted is grayed out. In this case, the browser 120 identifies the device type of each device before displaying the screen of FIG. 21 and compares the device type of each device with the device type corresponding to each package to determine whether the license allocation is permitted. In one example, each device is associated with tenant information identifying a tenant to which each device belongs in the management information of the device definition. In this example, a target device(s) for which determination as to whether a license allocation is permitted is performed is a device(s) corresponding to a tenant specified based on the tenant ID or the like that is input from the tenant administrator and received by the browser. In another example, all devices included in the management information of the device definition managed by the device management unit 230 are the target devices for which determination as whether a license allocation is permitted is performed.

Although in the present embodiment, the description given above of is an example case in which only a package(s) corresponding to a device type that matches the device type of the device 10 selected in the pull-down menu M is extracted, the embodiment is not limited thereto. In another example, the browser 120 can extract only a device(s) of a device type that matches the device type of the package selected in the pull-down menu M.

Further, although in the present embodiment, the device type is selected in S31, in another example, selection of one device such as MFP_001 or MFP_002 is received instead of the device type. In this case, the browser 120 determines the device type of the selected device according to the management information of the device definition acquired from the device management unit 230, and then performs the filtering process of step S32.

The tenant administrator configures settings of the device license by putting a check mark in the cell corresponding to the combination of the desired package and device 10 on the license allocation screen obtained through the filtering process (step S15). After the configuration of the settings is completed, the tenant administrator presses a "Save" button on the license allocation screen (step S16).

When the configuration of settings of the device license is completed, the browser 120 sends a request for a license allocation to the license management unit 220 (step S17).

As described heretofore, according to the present embodiment, allocating to a device a license that the device that cannot use is avoided.

Although in the embodiment, a package license is assigned to each device, but the embodiment is not limited thereto. In another example, a license of any suitable service can be allocated to each device, instead of the package license. For example, one or more above embodiments are applied to a process of allocating a license of a single application to each device instead of allocating a license of a package including plural applications. In this case, the server 5 stores application information that associates information of an application with a device type, and determination as to whether the license allocation is permitted is performed by comparing the device type associated with the application information with a device type of the target device. In substantially the same manner, determination can be performed as to whether allocation of a license of a web service is permitted or as to whether allocation of a license of a particular function of the service is permitted, instead of the package license. In this case, the server 5 stores web service information regarding a web service or function information regarding a function in association with the device type, instead of the application information, and determination as to whether the license allocation is permitted in substantially the same manner.

Further, since the license information includes the maximum number of licenses, the browser 120 may check whether the number of allocated licenses of the target package exceeds the upper limit (volume), and outputs a warning when the number of allocated licenses exceeds the upper limit.

Third Embodiment

Hereinafter, a description is given of a third embodiment. The third embodiment is different from the first embodiment and the second embodiment in that the tenant administrator logs in to the cloud system and obtains a user authentication ticket (or access token) before acquiring the license allocation screen in the license allocation process. In the third embodiment, the elements, functions, processes, and steps that are the same or substantially the same as those described in the first embodiment and the second embodiment are denoted by the same reference numerals or step numbers, and redundant descriptions thereof are omitted below. A description is given of the differences from the first embodiment and the second embodiment.

Figure 22:
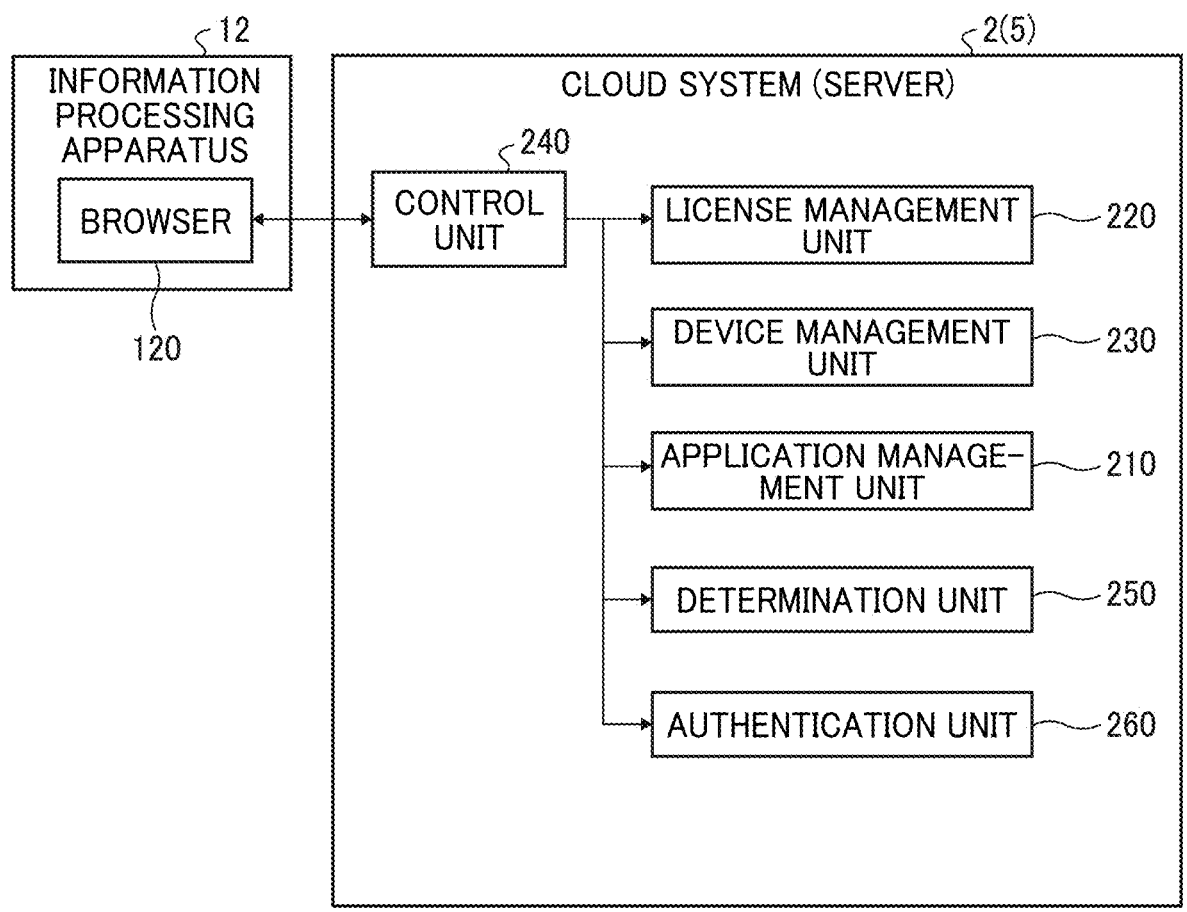
FIG. 22 is a block diagram illustrating an example of functions that the server includes, according to the third embodiment of the present disclosure.

FIG. 22 is a block diagram illustrating an example of functions that the server 5 includes, according to the third embodiment. As illustrated in FIG. 22, the server 5 further includes an authentication unit 260, in addition to the application management unit 210, the license management unit 220, the device management unit 230, the control unit 240, and the determination unit 250. Although only the modules related to the present embodiment are illustrated in the example of FIG. 22, modules that the server 5 includes are not limited thereto. The modules (functional units) of the server 5 may be configured by a single apparatus, for example, as in the present embodiment. In another example, the modules (functional units) are configured by two or more apparatuses. For example, the license management unit 220, the device management unit 230, and the application management unit 210 may be provided respectively in different apparatuses.

The authentication unit 260 transmits a user authentication ticket (or an access token) to the browser 120 in response to the login from the browser 120 of the information processing apparatus 12.

Figure 23:
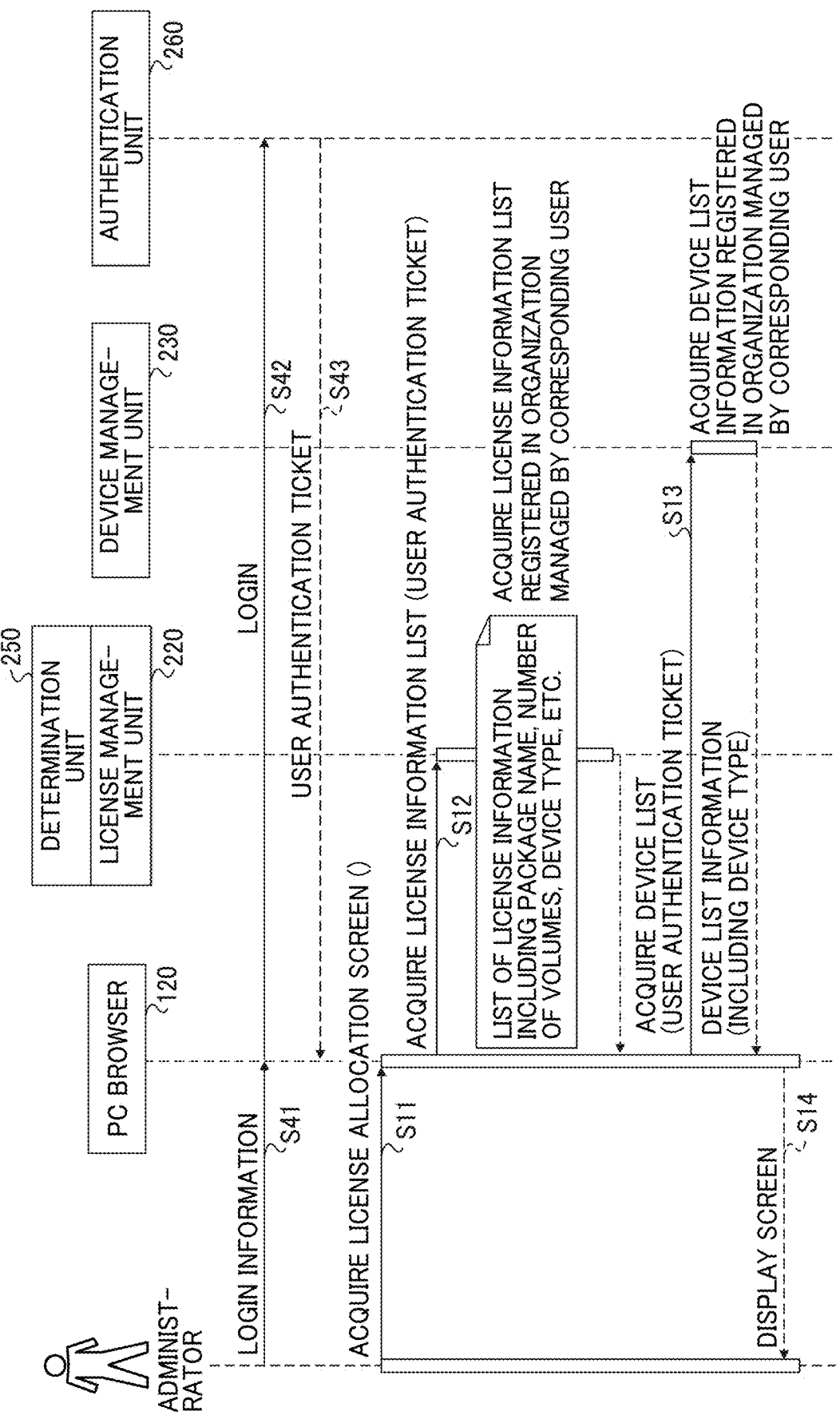
FIG. 23 is a sequence diagram illustrating a part of a license allocation process, according to the third embodiment of the present disclosure.

FIG. 23 is a sequence diagram illustrating a part of a license allocation process, according to the embodiment. As illustrated in FIG. 23, before acquiring the license allocation screen, the tenant administrator inputs login information via the browser 120 of the information processing apparatus 12 (step S41), and logs in to the cloud system (step S42). Then, the authentication unit 260 issues a user authentication ticket (or an access token that can identify a particular user) (step S43).

Next, the browser 120 of the information processing apparatus 12 receives a request for acquiring a license allocation screen together with the user authentication ticket from the tenant administrator (step S11). In response to receiving the request together with the user authentication ticket, the browser 120 acquires, from the license management unit 220, a license information list registered in an organization managed by a user (tenant administrator) corresponding to the user authentication ticket (step S12). The license information list is a list of license information including a package name, the number of volumes, the device type, and the like.

Further, the browser 120 acquires, from the device management unit 230, device list information registered in the organization (tenant) managed by the user (tenant administrator) corresponding to the user authentication ticket (step S13).

Next, the browser 120 displays a license allocation screen including a list of a plurality of types of devices associated with the organization (step S14). Subsequently, the processes of S15 and subsequent steps illustrated in FIG. 13 or the processes of step S31 and subsequent steps illustrated in FIG. 19 are performed, in substantially the same manner as the first embodiment and the second embodiment.

As described above, according to the present embodiment, since the user authentication ticket (or the access token that identifies a particular user) is transmitted when transmitting the request for the license allocation screen, the cloud system 2 can determine which user (tenant administrator) is operating the information processing apparatus 12. This enables the cloud system 2 to acquire the license information and the device information list registered in association with the organization (tenant) managed by the user (tenant administrator). Thus, the user (tenant administrator) can collectively allocate licenses to a plurality of types of devices of the tenant to which the user belongs. Further, a service such as an application or a package is prevented from being erroneously installed on a device of an unexpected type, and thereby preventing a malfunction from occurring. Accordingly, adverse effects on devices and cloud systems are avoided.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The apparatus group or device group described in one or more embodiments are just one example of plural computing environments that implement the one or more embodiments of the present disclosure.

In one or more embodiments, the server 5 includes plural computing devices, such as a server cluster. The plural computing devices are configured to communicate with one another through any type of communication link including a network, shared memory, etc., and perform the processes described in this disclosure.

The device 10 is not limited to an image forming apparatus as long as the device has a communication capability. The device 10 includes, for example, an output device such as a projector (PJ), an interactive whiteboard (IWB; an electronic whiteboard having mutual communication capability), and a digital signage, a head-up display (HUD), an industrial machine, an imaging device, a sound collecting device, a medical device, a networked home appliance, an automobile (connected car), a laptop computer, a mobile phone, a smartphone, a tablet terminal, a game console, a personal digital assistant (PDA), a digital camera, a wearable PC and a desktop PC.

According to one or more embodiments of the present disclosure, an allocation of a license to a device that cannot use the license is avoided.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

What is claimed is:

1. An information processing system including at least one server, one or more devices communicable with the server through a network, and circuitry configured to:
manage a service in association with a device type, the device type indicating a type of device capable of using the service;
manage the one or more devices in association with the device type, the one or more devices each being a target device to which a license is to be allocated;
transmit, to an information processing device different from the one or more devices, service information indicating the service managed in the server and device information indicating the one or more devices managed in the server;
receive a request from the information processing device to allocate a license of the managed service to the target device, the managed service being selected based on the service information, and the target device being based on the device information; and
determine, based on the request, whether an allocation of the license of the managed service to the target device is permitted by comparing a device type associated with the target device to which the license is to be allocated with the device type associated with the managed service.

2. The information processing system of claim 1, wherein the circuitry is further configured to, after selection of the target device, determine whether the allocation of the license of the service to the target device is permitted.

3. The information processing system of claim 1, wherein the circuitry is further configured to, based on a determination result indicating that the allocation of the license of the service is not permitted, notify a reason why the allocation of the license of the service is not permitted.

4. The information processing system of claim 1, wherein the circuitry is further configured to enable selection of the target device from one or more devices to which the license of the service can be allocated.

5. The information processing system of claim 1, wherein the circuitry is further configured to display a license allocation screen in which a combination of the service and the device to which the allocation of the license of the service is not permitted is grayed out.

6. The information processing system of claim 1, wherein the circuitry is further configured to enable a number of devices to which the license of the service is to be allocated to be specified for each device type or specified collectively regardless of the device type.

7. The information processing system of claim 1, wherein the circuitry is further configured to:
display, based on a tenant that requests allocation of the license, a license allocation screen;
receive the allocation of the license of the service from a list of a plurality of types of devices associated with the tenant, the tenant being a unit in which a tenant administrator manages various devices; and
manage, for each tenant, the service and the device type that can use the service in association with each other, based on the received allocation of the license.

8. The information processing system of claim 1, wherein the device type corresponds with at least one of a multifunction peripheral, an information processing apparatus, a projector, a videoconference system, a camera, or an interactive whiteboard.

9. The information processing system of claim 1, wherein the service is included in a package, and the circuitry is further configured to:
manage a service definition of the package, the service definition including a name, a uniform resource locator (URL), an available language, and the device type.

10. A server communicable with one or more devices through a network, the server comprising circuitry configured to:
- manage a service in association with a device type, the device type indicating a type of device capable of using the service;
- manage the devices in association with the device type, the devices each being a target device to which a license is to be allocated;
- transmit, to an information processing device different from the devices, service information indicating the service managed in the server and device information indicating the devices managed in the server;
- receive a request from the information processing device to allocate a license of the managed service to the target device, the managed service being selected based on the service information, and the target device being based on the device information; and
- determine whether an allocation of the license of the managed service to the target device is permitted by comparing a device type associated with the target device to which a license is to be allocated with the device type associated with the managed service.

11. The server of claim 10, wherein
the circuitry is further configured to, after selection of the target device, determine whether the allocation of the license of the service to the target device is permitted.

12. The server of claim 10, wherein
the circuitry is further configured to, based on a determination result indicating that the allocation of the license of the service is not permitted, transmit a notification indicating a reason why the allocation of the license of the service is not permitted.

13. The server of claim 10, wherein
the circuitry is further configured to enable selection of the target device from one or more devices to which the license of the service can be allocated.

14. The server of claim 10, wherein
the circuitry is further configured to display a license allocation screen in which a combination of the service and the device to which the allocation of the license of the service is not permitted is grayed out.

15. The server of claim 10, wherein
the circuitry is further configured to enable a number of devices to which the license of the service is to be allocated to be specified for each device type or specified collectively regardless of the device type.

16. The server of claim 10, wherein
the circuitry is further configured to manage the service in association with the device type that can use the service for each tenant, the tenant being a unit in which a tenant administrator manages various devices.

17. The server of claim 10, wherein the device type corresponds with at least one of a multifunction peripheral, an information processing apparatus, a projector, a videoconference system, a camera, or an interactive whiteboard.

18. A method of controlling license assignment performed by at least one server communicable with one or more devices through a network, the method comprising:
- managing a service in association with a device type, the device type indicating a type of device capable of using the service;
- managing the devices in association with the device type, the devices each being a target device to which a license is to be allocated;
- transmitting, to an information processing device different from the one or more devices, service information indicating the service managed in the server and device information indicating the one or more devices managed in the server;
- receiving a request from an information processing device to allocate a license of the managed service to the target device, the managed service being selected based on the service information, and the target device being based on the device information; and
- determining whether an allocation of the license of the managed service to the target device is permitted by comparing a device type associated with the target device to which a license is to be allocated with the device type associated with the managed service.

19. A non-transitory computer-readable medium storing a program that causes a computer for controlling a server communicable with one or more devices through a network to perform the method of claim 18.

20. The method of claim 18, wherein the device type corresponds with at least one of a multifunction peripheral, an information processing apparatus, a projector, a videoconference system, a camera, or an interactive whiteboard.

* * * * *